US012802547B2

(12) United States Patent
Becouarn et al.

(10) Patent No.: US 12,802,547 B2
(45) Date of Patent: Nov. 17, 2026

(54) TRANSPORTABLE FATIGUE LEVEL EVALUATION SYSTEM AND RELATED EVALUATION METHOD

(71) Applicant: THALES, Meudon (FR)

(72) Inventors: Loïc Becouarn, Merignac (FR); Bastien Berthelot, Merignac (FR); Vincent Ibanez, Merignac (FR); Sylvain Hourlier, Merignac (FR); Lionel Granier, Merignac (FR)

(73) Assignee: THALES, Meudon (FR)

(*) Notice: Subject to any disclaimer, the term of this patent is extended or adjusted under 35 U.S.C. 154(b) by 0 days.

(21) Appl. No.: 19/046,944

(22) Filed: Feb. 6, 2025

(65) Prior Publication Data

US 2025/0259524 A1 Aug. 14, 2025

(51) Int. Cl.

| | |
|---|---|
| ***G08B 21/06*** | (2006.01) |
| ***A61B 5/18*** | (2006.01) |
| ***G06V 40/16*** | (2022.01) |
| ***G08B 21/18*** | (2006.01) |
| ***G08B 25/01*** | (2006.01) |

(52) U.S. Cl.

CPC ........... *G08B 21/06* (2013.01); *G06V 40/171* (2022.01); *G08B 21/182* (2013.01); *G08B 25/016* (2013.01)

(58) Field of Classification Search

CPC ...................................................... G08B 21/06

See application file for complete search history.

(56) References Cited

U.S. PATENT DOCUMENTS

| | | | | |
|---|---|---|---|---|
| 6,559,770 B1 * | 5/2003 | Zoerb | .................... | G08B 21/06 340/576 |
| 2009/0306485 A1 * | 12/2009 | Bell | .................... | A61B 5/6839 600/301 |
| 2015/0326842 A1 * | 11/2015 | Huai | .................... | H04N 23/611 348/223.1 |
| 2017/0147871 A1 | 5/2017 | Tseng et al. | | |

(Continued)

FOREIGN PATENT DOCUMENTS

| | | |
|---|---|---|
| EP | 3395237 A1 | 12/2021 |
| FR | 3038770 A1 | 1/2017 |
| FR | 3133534 A1 | 9/2023 |

OTHER PUBLICATIONS

FR 2401396, INPI Rapport de Recherche Preliminaire, Aug. 8, 2024, 2 pages.

*Primary Examiner* — Davetta W Goins
*Assistant Examiner* — Pameshanand Mahase
(74) *Attorney, Agent, or Firm* — Soquel Group LLC

(57) ABSTRACT

A transportable system of evaluation of a level of fatigue of at least one operator. The system includes a case, a camera configured to acquire images of the face of an operator, a sensor configured to measure a heart rate of the operator, a calculator, and a human-machine interaction device. The calculator is configured to receive the images acquired from the camera and the measurement of the heart rate from the sensor, and configured to process the images and the measurement to calculate a level of fatigue of the operator. The human-machine interaction device is configured to transmit an alert if the calculated level of fatigue is greater than a predefined threshold. The calculator and the human-machine interaction device are at least partially integrated into the case. The camera and the sensor are integrated or apt to be stowed in the case.

12 Claims, 5 Drawing Sheets

(56) References Cited

U.S. PATENT DOCUMENTS

| | | | | |
|---|---|---|---|---|
| 2017/0262060 A1* | 9/2017 | Katsuki | .................... | G06F 3/016 |
| 2018/0193652 A1* | 7/2018 | Srivastava | ........... | A61B 5/4836 |
| 2020/0046300 A1* | 2/2020 | Senegas | ............... | A61B 5/7292 |
| 2020/0121262 A1* | 4/2020 | De Haan | .............. | A61B 5/7246 |
| 2022/0047160 A1* | 2/2022 | Yoo | ...................... | A61B 5/0823 |
| 2023/0293114 A1* | 9/2023 | Berthelot | ............. | A61B 5/7267 |
| | | | | 600/301 |

* cited by examiner

TRANSPORTABLE FATIGUE LEVEL EVALUATION SYSTEM AND RELATED EVALUATION METHOD

REFERENCE TO RELATED APPLICATION

This application is a U.S. non-provisional application claiming the benefit of French Patent Application No. 24 01396 filed on Feb. 13, 2024, the contents of which are incorporated herein by reference in their entirety.

TECHNICAL FIELD OF THE INVENTION

The present invention relates to a transportable system for objectively evaluating a level of fatigue of at least one operator.

The present invention relates to the field of objective evaluation of level of fatigue, particularly of operators in a professional context.

BACKGROUND OF THE INVENTION

In some professions, the level of fatigue of operators is a fundamental issue, in particular when the operator's profession is to make decisions that could put his/her life or the lives of others at risk.

It is known that an advanced level of fatigue impairs brain performance, in particular the reaction time and the quality of the decisions taken.

Thereby, when an operator is tired, the quality of the decisions taken is impaired.

Furthermore, in a context of advanced fatigue, the operator is likely to doze off or even fall asleep, thereby making him/her unfit for the tasks incumbent on him/her.

More particularly, in the aeronautical field, the task of the flying crew, and in particular the pilot(s), is to ensure the safety of passengers and their transport to their destination point.

In airlines, management systems for managing the risk relating to fatigue, also known as the Fatigue Risk Management System (FRMS), have been implemented. Such systems are based on declarative questionnaires on the level of fatigue, associated with a biomathematic model predicting the evolution of fatigue during a flight. The purpose of such systems is to predict phases of drowsiness during a flight.

However, such systems are highly subjective as are limited by the operator's declarations before the flight. Thereby, there is a strong bias associated with the state the operator finds himself in when giving his declaration. For example, the state is strongly influenced by his food consumption, stress level or excitement at the time he makes his statement.

Moreover, it is not wise to ask the operator to make a declaration again during their work, since the interruption would risk de-concentrating him and could lead to risks for them or for the passengers.

There is thus a need for a system of non-interruptive and more objective evaluation of fatigue, that eliminates any declarative bias and serves to measure the fatigue of an operator without diverting him from his work.

SUMMARY OF THE INVENTION

To this end, the present invention relates to a transportable system for evaluating a level of fatigue of at least one operator, the system including:

- a case;

- a camera configured to acquire images of an operator's face;
- a sensor configured to measure an operator's heart rate;
- a calculator configured for:
  - receiving, from the camera, the acquired images of the operator's face,
  - receiving, from the sensor, a measurement of the operator's heart rate, and
  - processing the received images and measurement to calculate a level of fatigue of the operator; and
- a human-machine interaction device configured to send an alert to the operator and/or to an administrator if the calculated level of fatigue is greater than a predefined threshold;

the calculator and the human-machine interaction device being at least partially integrated into the case.

- the camera and the sensor being integrated or suitable for being stowed in the case.

The heart rate sensor and camera allow the acquisition of data representative of the level of fatigue of the operator without the need for the operator to distract themselves from their current task.

Furthermore, the fact that the sensor, camera, calculator and human-machine interaction device are integrated or suitable for being integrated into the case makes the system easily transportable and thus makes possible an evaluation of the level of fatigue: before, during and/or after an operator's mission.

According to other particular embodiments of the invention, the system includes one or a plurality of the following features, taken individually or according to all technically possible combinations:

- the sensor configured to measure the heart rate is a bracelet configured to be positioned around the operator's wrist to measure their heart rate;
- the camera is apt to acquire images of the face of at least one operator who is located at a distance of between 30 and 130 cm from the case, and according to an angular travel defined about an optical axis of the camera, at least equal to 30°;
- the case includes first and second shells movable between an open position and a closed position,
- the first shell defining a first compartment suitable for storing the camera and a zone for receiving the sensor,
- the sensor being removable from the receiver zone;
- the first shell defines a surface for being at least partially in contact against the second shell when the first and second shells are in the closed position,
- the camera defining an optical axis having an elevation angle with respect to the surface comprised between 30° and 40°, and a positioning angle about an axis perpendicular to the surface comprised between 55° and 65°;
- the case further includes a power supply configured to supply electrical energy to the camera, the heart rate sensor, the calculator and a human-machine interaction device;
- the calculator is configured to determine facial markers of the operator from the acquired images and, furthermore, to calculate the level of fatigue of the operator from the determined facial markers;
- the system includes a plurality of heart rate sensors, each of which is suitable for measuring the heart rate of a respective operator,
- the system further including one amongst:
  - a plurality of cameras each configured to acquire images of a face of a respective operator, and

- a single camera configured to acquire images of a face of each of a plurality of operators,
- the calculator being configured to calculate a level of fatigue of each operator from the measurement of the heart rate of the operator and the acquired images of the operator's face; and
- the human-machine interaction device includes a display screen and/or a loudspeaker, and optionally a vibrator integrated into the sensor,
- furthermore, the human-machine interaction device is configured to indicate to the operator when the image acquisition and the heart rate measurement have been completed,
- preferably, the human-machine interaction device being further configured to acquire data relating to the or to each operator, also preferably, the human-machine interaction device being configured to signal to the operator if he leaves the field of view of the camera and/or if the operator's eyes leave the field of view of the camera.

A further subject matter of the invention relates to a method for evaluating the level of fatigue of an operator, the method being implemented by such a transportable system and including:

- acquisition of a plurality of images of the operator's face,
- measurement of the operator's heart rate so as to obtain a measurement of the heart rate,
- processing the acquired images and the heart rate measurement so as to calculate the level of fatigue of the operator, and
- if the level of fatigue is above a predefined threshold, transmission of an alert to the operator and/or to an administrator.

BRIEF DESCRIPTION OF THE DRAWINGS

The system according to the invention and the embodiments thereof will be better understood upon reading the following description, given only as a non-limiting example, and made with reference to the enclosed drawings, wherein.

DETAILED DESCRIPTION OF THE INVENTION

Figure 1:
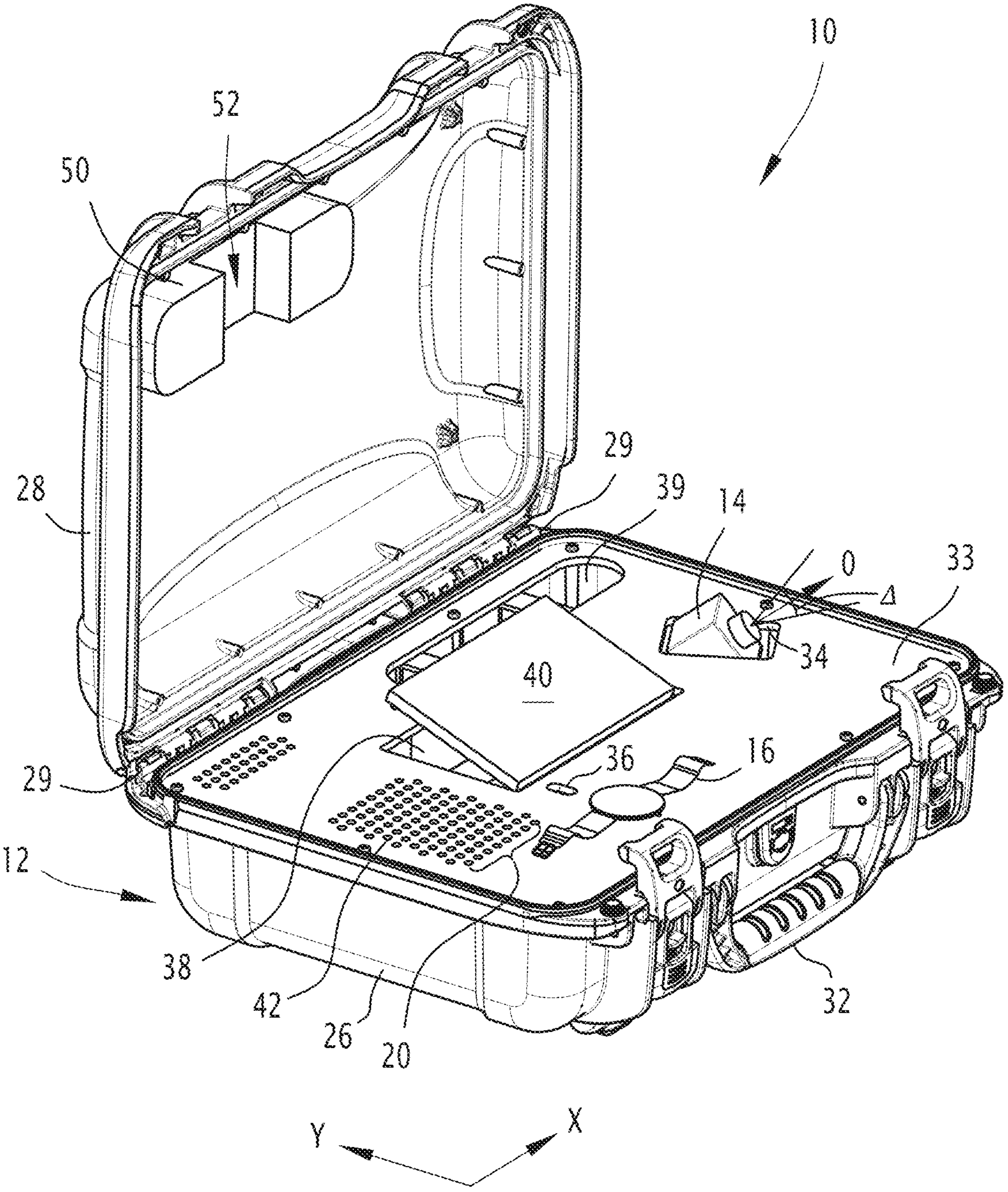
FIG. 1 is a schematic representation of a transportable system of evaluation of a level of fatigue according to a first embodiment of the invention.

With reference to FIG. 1, a transportable system 10 of evaluation of a level of fatigue of at least one operator, is described.

Figure 3:
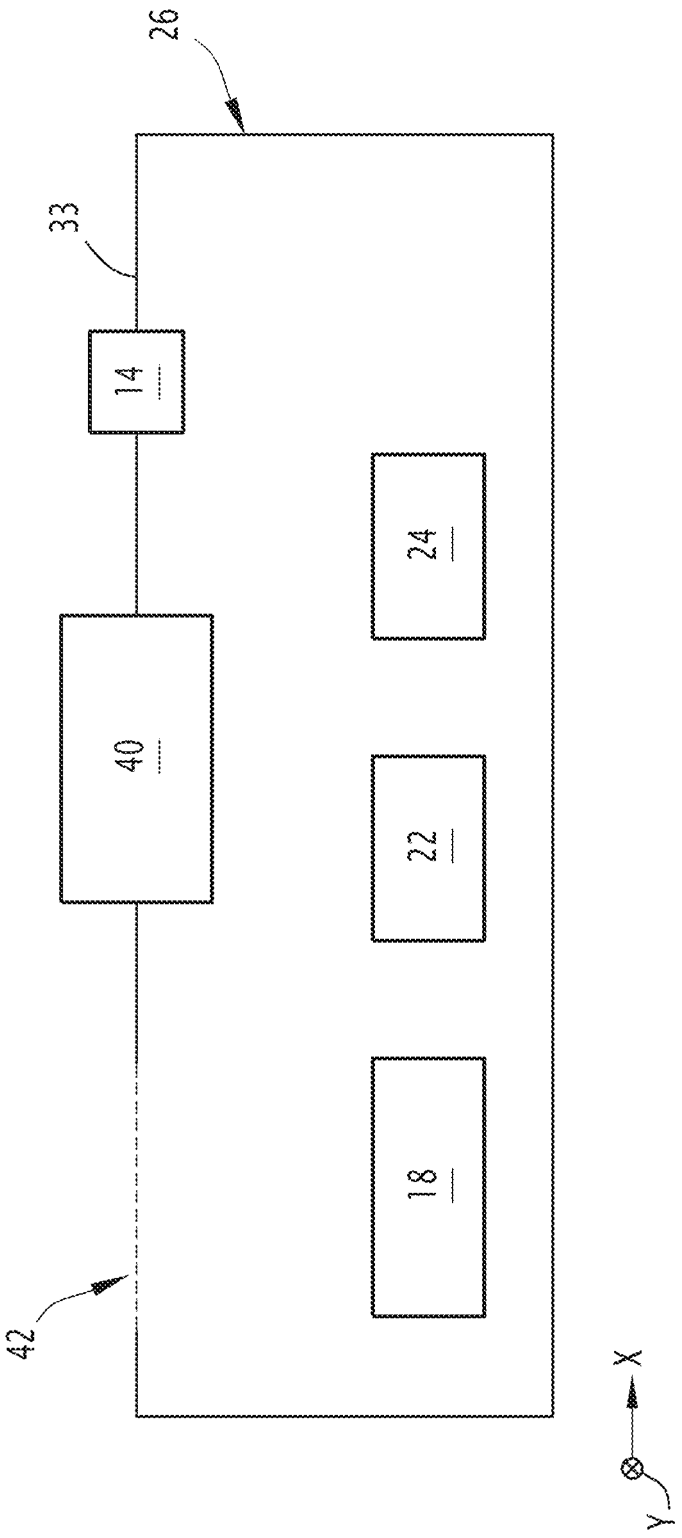
FIG. 3 is a sectional schematic representation of the system shown in FIG. 1.

System 10 includes a case 12, a camera 14, a sensor 16, a calculator 18, a human-machine interaction device 40 and optionally a power supply 22 shown in FIG. 3, and an array antenna 24, visible in FIG. 3.

Calculator 18, human-machine interaction device 40 and optionally power supply 22, and array antenna 24 are integrated into case 12. Camera 14 and sensor 16 are integrated or suitable for being stowed in case 12.

Case 12 is intended to be placed on a surface, called a support surface, such as a table or a dashboard of a cockpit.

Case 12 preferentially includes a first shell 26 and a second shell 28 that may be moved between an open position and a closed position.

Preferably, case 12 includes means 29 forming a pivot making the first shell 26 and the second shell 28 rigidly attached with one of the respective edges thereof and making same movable with respect to one another.

Also preferentially, case 12 further includes means for locking first 26 and second 28 shells in the closed position.

Furthermore, case 12 advantageously includes on one of the shells 26, 28 thereof, a handle 32 for transporting the case when shells 26, 28 are in the closed position.

The means of locking are preferably positioned on both sides of handle 32 on the same edge.

The dimensions of case 12 are, e.g. such that the case satisfies the dimensional requirements of a cabin luggage. For example, case 12 has dimensions less than 55×35×25 centimeters. Advantageously, case 12 is in the form of a suitcase.

First shell 26 has a substantially parallelepipedal shape defining a not-shown surface apt to be in contact with the support surface, and a surface 33, called the opposite surface, opposite the not-shown surface. Opposite surface 33 is substantially rectangular and defines a first direction of extension X and a second direction of extension Y perpendicular to each other.

Opposite surface 33 is intended to be at least partially in contact with second shell 28 when first shell 26 and second shell 28 are in the closed position.

The first direction of extension X is substantially parallel to the edge of first shell 26 having the means forming a pivot 29 with second shell 28, the second direction of extension Y being substantially perpendicular to said edge.

First shell 26 preferably defines a first compartment 34 apt to store camera 14.

Optionally, first shell 26 is apt to receive sensor 16 on opposite surface 33. First shell 26 then preferably defines a receiving zone including an orifice 36 for passage of a charging cable, also called a charger, of sensor 16 when same rests on opposite surface 33, as shown in FIG. 1.

Preferentially, first shell 26 further defines a second compartment 38 suitable for at least partially storing human-machine interaction device 40, and optionally a third compartment 39 suitable for at least partially storing power supply 22, preferentially a cable of the power supply (not shown).

According to an example not shown, human-machine interaction device 40 and calculator 18 are made of the same element. In other words, a single physical unit includes human-machine interaction device 40 and calculator 18.

Advantageously, first shell 26 further defines a ventilation 20 formed by ventilation holes 42 extending through opposite surface 33, to ensure the ventilation of elements integrated into the shell, under the surface 33. The elements are described hereinafter.

As will be described hereinafter, sensor 16 is preferably removable from shell 26. In the embodiment shown in FIG. 1, camera 14 and human-machine interaction device 40 are not removable from first compartment 34 and from second compartment 38, respectively.

First compartment 34, second compartment 38, and third compartment 39 as well as orifice 36 are, e.g., formed in opposite surface 33.

Camera 14 is configured, e.g., to acquire images of a face of the operator positioned close to case 12.

In the embodiment shown in FIG. 1, camera 14 is fixed with respect to case 12, i.e., integrated into first compartment 34 and not removable from compartment 34.

The camera 14 defines an optical axis O.

Figure 2:
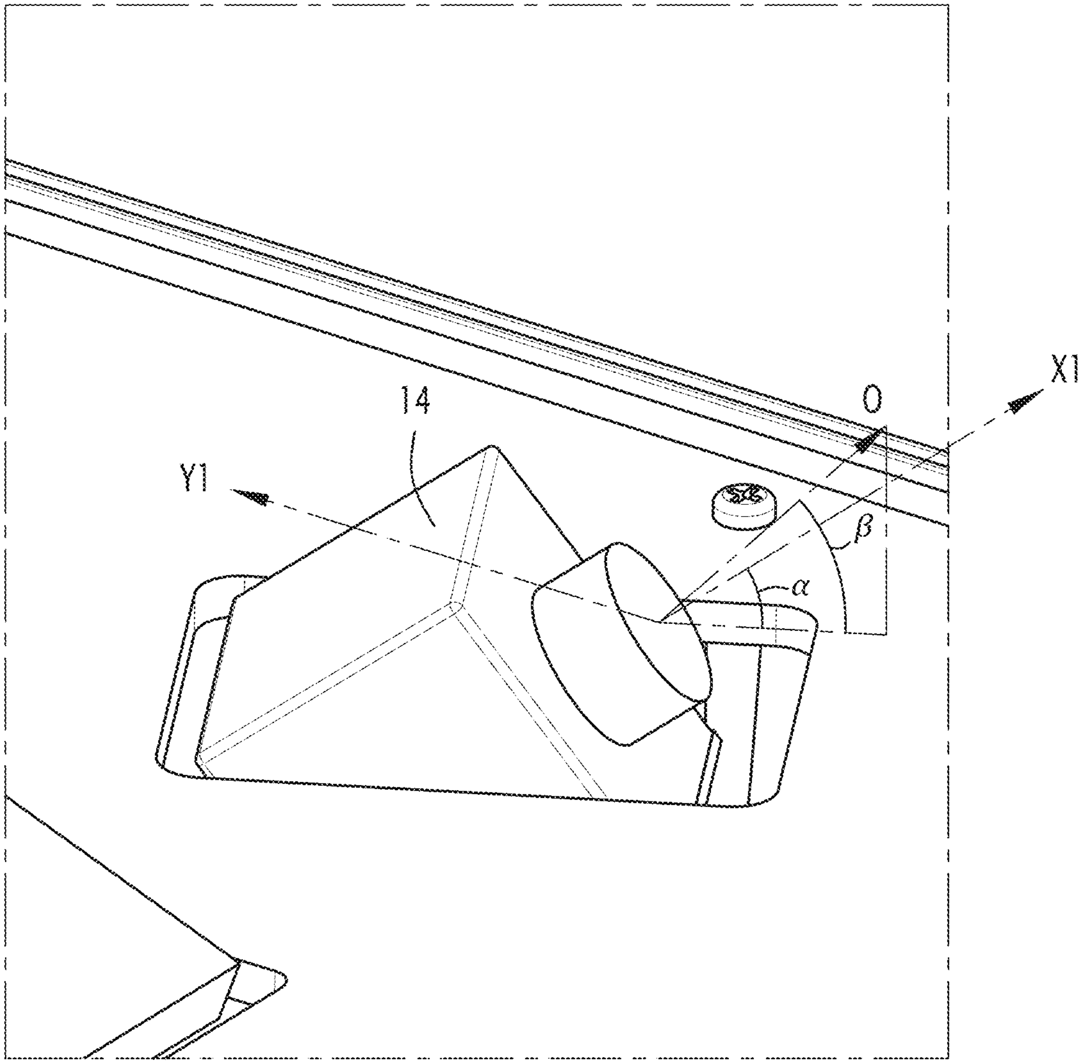
FIG. 2 is a detailed schematic representation of the camera of the system shown in FIG. 1.

As shown in FIG. 2 illustrating camera 14 in detail, a reference frame centered on camera 14 is defined by a first axis X1 extending along the first direction X and by a second axis Y1 extending along the second direction Y. In the frame of reference, optical axis O forms a positioning angle α with first axis X1. The positioning angle α is preferentially comprised between 55° and 65°.

It should be understood that positioning angle α is an angle about an axis (not shown) perpendicular to opposite surface 33.

Optical axis O forms an elevation angle β with respect to opposite surface 33, between 30° and 40°.

In FIG. 2, the coordinate system X1, Y1 is shown in dashed lines and the projections of optical axis O on the coordinate system are shown in chain-dotted lines.

The values of positioning angle α, of elevation angle β and of an angular travel Δ enable camera 14 to acquire images of the face of the operator even if the operator is not positioned facing case 12. Thereby, the operator is free to perform other tasks while camera 14 acquires images of their face.

Furthermore, and again with reference to FIG. 1, camera 14 is apt to acquire images of the face of an operator which is located at a distance between 30 cm and 130 cm from case 12, and according to angular travel Δ, defined about optical axis O, at least equal to 30°. Preferably, angular travel Δ is equal to plus or minus 20° along a plane parallel to opposite surface 33, i.e., horizontally, and plus or minus 15° along a plane perpendicular to opposite surface 33, i.e., vertically.

Optionally, camera 14 is an infrared camera.

According to an example not shown, illuminators, e.g., infrared LEDs, are arranged close to camera 14 to illuminate the operator during acquisition of images by camera 14. It is thereby possible to use the images of the operator's face even in dark environments.

Sensor 16 is configured to measure the heart rate of an operator.

For example, and as illustrated in FIG. 1, sensor 16 is a bracelet configured to be positioned around a wrist of the operator to measure their heart rate.

Sensor 16 is suitable for resting on opposite surface 33. For example, sensor 16 has a dial comprising the electronic circuitry intended to carry out measurements.

To hold sensor 16 in place when same rests on opposite surface 33 in the closed position, second shell 28 preferably includes an extruded portion 50 protruding from second shell 28 and intended to be in contact with sensor 16 in the closed position. Preferentially, when sensor 16 has a dial, extruded portion 50 defines a recess 52, one dimension of which corresponds to a diameter of the dial, so as to cooperate with sensor 16 in the closed position.

Extruded portion 50 is, e.g., a foam.

It should then be understood that, when sensor 16 rests on opposite surface 33, the bracelet thereof extends along the first direction of elongation X.

For example, sensor 16 is configured to measure the heart rate of the operator by photoplethysmography, called PPG. The technique is known per se.

Alternatively, sensor 16 is configured to carry out the measurement on the basis of an analysis of the electrical response between sensor 16 and the wrist of the operator, or by analysis of radar signals propagating along the wrist of the operator.

As an optional addition, sensor 16 is configured to additionally measure other physiological parameters of the operator, such as blood pressure, oxygen saturation, sweating, level of dehydration.

For oxygen saturation, e.g., in a known manner, sensor 16 is configured, e.g., to transmit, toward of the skin of the operator, and to receive, a light signal including at least two wavelengths. A first wavelength corresponds to a wavelength absorbed by saturated red blood cells, and a second wavelength corresponds to a wavelength absorbed by unsaturated red blood cells.

In the present example, sensor 16 is configured to determine the oxygen saturation of the operator by comparing light intensity received at each of the two wavelengths.

Preferentially, the cable of a charger (not shown), such as an induction charger or a direct contact charger, configured to recharge sensor 16 when it is positioned on opposite surface 33, extends through orifice 36.

With reference to FIG. 3 representing a sectional view of first shell 26 along a sectional plane perpendicular to the second direction of elongation Y, first shell 26 preferably integrates, under opposite surface 33, calculator 18, a part of power supply 22, and array antenna 24.

Calculator 18 is configured to receive, from camera 14, the acquired images of the operator's face. To this end, calculator 18 is, e.g., connected to camera 14 via a wire link (not shown).

Calculator 18 is also configured to receive, from sensor 16, the measurement of the heart rate, e.g., via a wireless connection passing through array antenna 24 as such connected to calculator 18.

Calculator 18 is also configured to process images from camera 14 and the measurement received, i.e., the data from sensor 16, to calculate a level of fatigue of the operator.

The level of fatigue is, e.g., a score given on a scale of 20 or of 100.

To this end, calculator 18 is preferably configured to determine facial markers of the operator. Facial markers are points of interest located on the face and from which different features are suitable for being extracted. As examples, the features are: statistics of yawning, opening of eyes, direction of the gaze and of the head, frequency of eye blinking, etc.

Furthermore, calculator 18 is preferably configured to calculate the level of fatigue of the operator from the determined facial markers.

For example, calculator 18 is configured to extract the features of the facial markers, e.g. using a technique such as same presented in patent applications FR 3133534 and FR 3133691.

Calculator 18 is then configured to supply such features, as well as the measurement, i.e. the data from the sensor 16, to an artificial intelligence model trained beforehand from a labeled set of data, in order to determine the level of fatigue of the operator.

For example, the artificial intelligence model is a neural network.

The neural network includes an ordered succession of neuron layers, each of which takes the inputs thereof from the outputs of the preceding layer.

More precisely, each layer includes neurons taking the inputs thereof from the outputs of the neurons of the preceding layer, or from the input variables for the first layer.

Each neuron is also associated with an operation, i.e. a type of treatment, to be performed by said neuron within the corresponding processing layer.

Each layer is linked to the other layers by a plurality of synapses. A synaptic weight is associated with each synapse, and each synapse forms a link between two neurons. Each synaptic weight is preferentially a real number that may take positive as well as negative values. In certain cases, each synaptic weight is a complex number.

Each neuron is apt to perform a weighted sum of the value(s) received from the neurons of the preceding layer, each value then being multiplied by the respective synaptic weight of each synapse, or link between the neuron and the neurons of the preceding layer, then to apply an activation function, typically a non-linear function, to the weighted sum, and to deliver at the output of the neuron, more particularly to the neurons of the next layer which are connected thereto, the value resulting from the application of the activation function. The activation function is used for introducing a non-linearity in the processing performed by each neuron. The sigmoid function, the hyperbolic tangent function, the Heaviside function, the Rectified Linear Unit (ReLU), and the softmax function, are examples of activation functions.

As an optional addition, each neuron is also apt to apply, in addition, a multiplicative factor, also called bias, to the output of the activation function, and the value delivered at the output of the neuron is then the product of the bias value and of the value derived from the activation function. Calculator 18 is then configured to communicate to the operator the level of fatigue via the human-machine interaction device, as will be described hereinafter.

As a variant, calculator 18 is configured to transmit the calculated level of fatigue to a device external to system 10 via array antenna 24, intended for an administrator.

As may be seen in FIG. 1, human-machine interaction device 40 includes, e.g., a display screen, such as a touch screen, and optionally a loudspeaker (not shown).

The loudspeaker is, e.g., located below ventilation holes 42.

Alternatively, the display screen includes a non-touch screen 40 and a keyboard (not shown).

As an optional supplement, human-machine interaction device 40 is also partially integrated into sensor 16, e.g., in the form of a vibrator (not shown).

Human-machine interaction device 40 is configured to send an alert to the operator and/or to an administrator if the calculated level of fatigue is greater than a predefined threshold.

To this end, if the recipient of the alert is the operator of system 10, the alert is, e.g., a message displayed on touch screen 40 or a sound signal emitted by the loudspeaker.

If the recipient of the alert is an administrator, the alert is, e.g., transmitted via array antenna 24.

As an optional supplement, human-machine interaction device 40 is configured to acquire data relating to the operator or to each operator, such as their gender, age, height, weight, or others.

Furthermore, human-machine interaction device 40 is preferably configured to indicate to the operator when the image acquisition and the heart rate measurement have been completed.

To this end, preferably, the vibrator integrated in sensor 16 is configured to vibrate when acquisition of images and measurement of the heart rate are completed.

Preferably, human-machine interaction device 40 is configured to signal to the operator if he leaves the field of view of camera 14 during acquisition of images, more particularly, if his eyes leave the field of view of camera 14. The field of view of camera 14 is preferably defined by positioning angle α, elevation angle β and angular travel Δ.

As an example, the eyes of the operator may leave the field of vision if the operator turns or inclines his head or if the operator moves and is no longer in front of camera 14.

Advantageously, in order to perform such a signaling to the operator, the vibrator integrated into sensor 16 is configured to vibrate.

Power supply 22 is suitable for supplying electrical energy to camera 14, to sensor 16, to calculator 18, and to human-machine interaction device 40. For example, power supply 22 includes a cable suitable for connection to a power distribution plug.

In a variant, power supply 22 is a battery.

Array antenna 24 is suitable for being connected to a local network system, e.g., via a Wi-Fi™ or Bluetooth™ protocol, or a global network system via a cellular protocol 4G or 5G. Array antenna 24 is capable of transferring data between calculator 18 and an external system (not shown), such as the level of fatigue determined by calculator 18.

Optionally, array antenna 24 is also apt to communicate with sensor 16 so that calculator 18 receives measurements of the heart rate.

Figure 4:
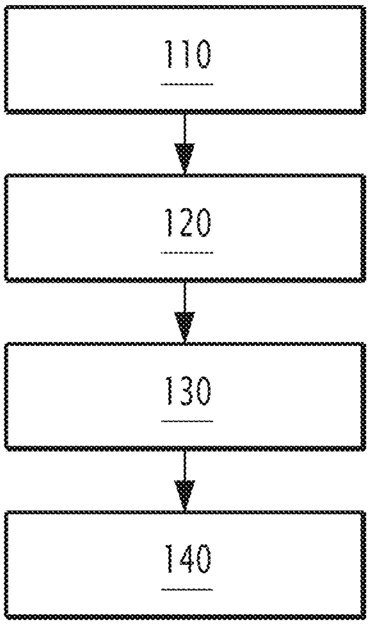
FIG. 4 is a flowchart of a method of evaluation of level of fatigue.

Operation of system 10 will now be described with reference to FIG. 4, illustrating a flowchart of a method of evaluation of a level of fatigue of an operator. The method is used, e.g., before, during or after a flight.

Initially, the operator opens case 12 and takes hold of sensor 16. Optionally, if power supply 22 includes a power cable, the operator connects the cable to a power distribution plug.

If sensor 16 is a bracelet, the operator positions same around his wrist.

The operator positions case 12 so as to be in the field of view of camera 14. It should be then understood that case 12 is not directly in front of the operator but slightly offset to the side so as not to clutter the zone in front of the operator so that he can perform different tasks, even while his level of fatigue is evaluated.

Preferentially, the operator identifies himself on system 10. To this end, identification of the operator is carried out, e.g., via a code entered manually by the operator on human-machine interaction device 40, or by reading a code via NFC or a QR code read by camera 14.

The method includes an acquisition operation 110, during which camera 14 acquires a plurality of images of the face of the operator.

Preferably, during acquisition operation 110, if the operator and/or his eyes leave the field of view of the camera, defined by: positioning angle α, elevation angle β and angular travel Δ, human-machine interaction device 40 signals that the operator leaves the field of view of camera 14, e.g., by vibrating the vibrator integrated in sensor 16, or alternatively by emitting a sound or by displaying a message.

The method further includes an operation 120 of measuring the heart rate of the operator in order to obtain a measure of his heart rate, preferably by sensor 16.

Preferably, acquisition operation 110 and measurement operation 120 are implemented simultaneously.

The method further includes an operation 130 of processing the acquired images and of measurement of the heart rate to calculate the level of fatigue of the operator.

As explained hereinabove, preferentially, calculator 18 determines the facial markers of the operator. Calculator 18 then extracts the features of the facial markers and supplies the features and the measurement to the artificial intelligence model trained beforehand to determine the level of fatigue.

The method then includes, if the level of fatigue is greater than a predefined threshold, an operation 140 of transmission of an alert to the operator and/or to an administrator, as explained hereinabove.

A second embodiment will now be described with reference to FIG. 5.

The common elements between the first and second embodiments keep the reference numbers thereof. Only the distinct elements have a reference incremented by the value 200.

The second embodiment will be described only by the differences thereof with the first embodiment so that each feature that is not described is identical to the corresponding feature in the first embodiment.

In the second embodiment, transportable system 210 is more compact than transportable system 10 of the first embodiment.

In the second embodiment, first compartment 234 is contiguous with second compartment 238.

Figure 5:
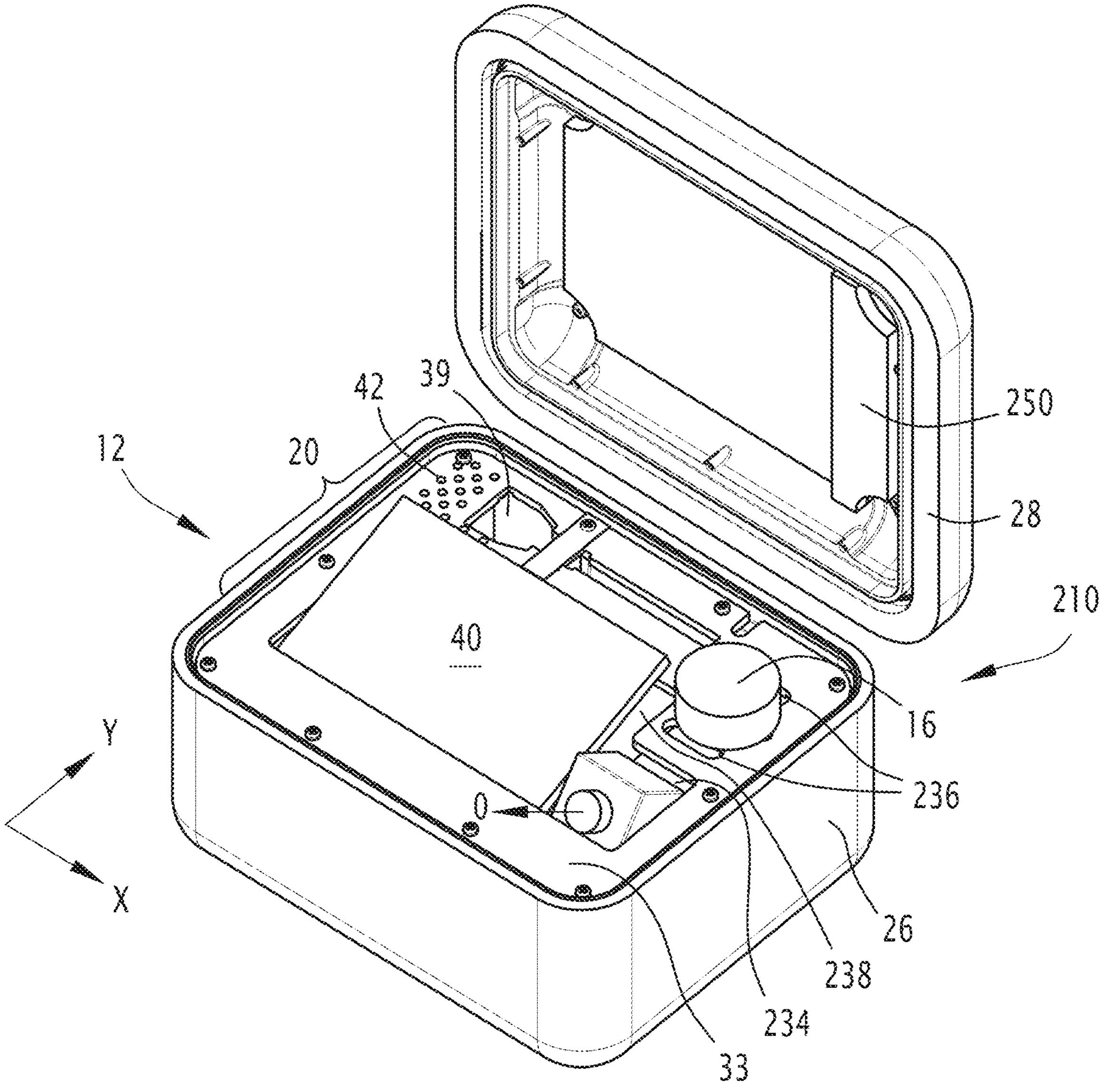
FIG. 5 is a schematic representation of a transportable system of evaluation of a level of fatigue according to a second embodiment of the invention.

According to the example illustrated in FIG. 5, first compartment 234 and second compartment 238 are, e.g., common. In other words, according to such example, there is no physical delimitation between first compartment 234 and second compartment 238.

In the second embodiment, first compartment 234 should be understood substantially along the first X and the second Y directions.

In the second embodiment, optical axis O of camera 14 is, in projection onto opposite surface 33 substantially aligned with the second direction of elongation Y, in an opposite direction. In other words, positioning angle α has a value substantially equal to 90°.

In the second embodiment, the receiver zone of sensor 16 preferably defines three orifices 236 rather than a single orifice in the first embodiment. Two of the three orifices are then preferably slots, e.g., parallel to each other and optionally extending along the first direction of elongation X. Each of the two orifices 236 is intended to receive a lug of the bracelet of sensor 16 for the stowage thereof in the closed position. Third orifice 36, not shown in FIG. 5, is intended for passage of the cable of the charger of sensor 16.

In FIG. 5, only two of the three orifices 236 are visible.

Preferably, second shell 28 further includes extruded portion 250. However, in the second embodiment, extruded portion 250 preferably has no set-back and is in contact with sensor 16 only via the dial of the latter, when same is present, in the closed position.

In the second embodiment, ventilation holes 42 extend over a zone on opposite surface 33 smaller than in the first embodiment. The loudspeaker is optionally placed under ventilation holes 42.

In the second embodiment, the means of locking are positioned on edges of first shell 26 and second shell 28 substantially perpendicular to the edge including handle 32 and same including the pivot-forming means. The pivot-forming means are not represented in FIG. 5.

Thereby, system 210 according to the second embodiment is more compact than system 10 according to the first embodiment, which enhances even more the transportable aspect of system 210.

The operation of system 210 according to the second embodiment is similar to the operation of the system 10 according to the first embodiment. Thereby, system 210 according to the second embodiment is suitable for implementing the method of evaluation of the level of fatigue described hereinabove.

In the second embodiment, optical axis O of camera 14 is such that the operator is placed in front of the case during the image acquisition. However, the compactness of system 210 according to the second embodiment makes it possible not to clutter up the space in front of the operator.

Alternatively, camera 14 is oriented toward the right-hand or left-hand side of system 10, so that the system may be placed on the left or on the right, respectively, of the operator while pointing camera 14 toward the operator.

Variants of systems 10 and 210 will now be described wherein the system is configured to simultaneously evaluate the level of fatigue of a plurality of operators. The variants are compatible with systems 10 and 210 according to the first and second embodiments.

In the variants, systems 10 and 210 include a plurality of sensors 16. Preferably, first case 26 then includes a plurality of orifices 236, or triplet of orifices 236.

According to a first variant, systems 10 and 210 further include a plurality of cameras 16, each configured to acquire images of a face of a respective operator.

According to a second variant, systems 10 and 210 include a single camera configured to acquire images of a face of each of a plurality of operators.

In the variants, calculator 18 is configured to calculate a level of fatigue of each operator from the measurement of the heart rate of the operator and the acquired images of the face of the operator, as explained hereinabove for each operator.

According to the variants, systems 10 and 210 are suitable for implementing the method for evaluating the level of fatigue described hereinabove, for each operator.

Systems 10 and 210 according to the invention serve to evaluate the fatigue of the operator without distracting them from their work and by dispensing with the declarative bias.

Furthermore, systems 10 and 210 enable an evaluation of the level of fatigue that is objective and non-intrusive since the operator is completely passive during the evaluation.

Furthermore, the fact that systems 10 and 210 are transportable makes the use thereof particularly easy and possible in multiple situations.

The invention claimed is:

1. A transportable system for evaluating a level of fatigue of an operator, comprising:

a camera acquiring images of a face of the operator;

a sensor measuring a heart rate of the operator;

a case comprising first and second shells movable between an open position and a closed position, the first shell defining a first compartment suitable for storing said camera and a receiver zone of said sensor, said sensor being removable from the receiver area;

a calculator at least partially integrated into said case, receiving, from said camera, the acquired images of the operator's face, receiving, from said sensor, a measurement of the operator's heart rate, and processing the received images and measurement to calculate a level of fatigue of the operator; and a human-machine interaction device at least partially integrated into said case, configured to send an alert to the operator and/or to an administrator if the calculated level of fatigue is greater than a predefined threshold.

2. The system according to claim 1, wherein said sensor comprises a bracelet configured to be positioned around a wrist of the operator to measure his heart rate.

3. The system according to claim 1, wherein said camera acquires images of the face of at least one operator who is located at a distance between 30 cm and 130 cm from said case, according to an angular travel defined about an optical axis of said camera, at least equal to 30°.

4. The system according to claim 1, wherein said first shell defines a surface for being at least partially in contact with said second shell when said first and second shells are in the closed position, said camera defining an optical axis having an elevation angle with respect to the surface between 30° and 40°, and a positioning angle about an axis perpendicular to the surface between 55° and 65°.

5. The system according to claim 1, wherein said case further comprises a power supply configured to supply electrical power to said camera, said sensor, said calculator, and said human-machine interaction device.

6. The system according to claim 1, wherein said calculator determines facial markers of the operator from the acquired images and calculates the level of fatigue of the operator from the determined facial markers.

7. The system according to claim 1, comprising:

a plurality of heart rate sensors, each measuring the heart rate of a respective operator; and either a plurality of cameras each acquiring images of a face of a respective operator, or a single camera acquiring images of a face of each of a plurality of operators, wherein said calculator calculates a level of fatigue of each operator from the measurement of the heart rate of the operator and from the acquired images of the face of the operator.

8. The system according to claim 1, wherein said human-machine interaction device comprises a display and/or a loudspeaker, and wherein said human-machine interaction device indicates to the operator when the image acquisition and the heart rate measurement have been completed.

9. The system according to claim 8 wherein said human-machine interaction device comprises a vibrator integrated into said sensor.

10. The system according to claim 8 wherein said human-machine interaction device acquires data relating to the operator.

11. The system according to claim 8 wherein said human-machine interaction device signals to the operator if he leaves the field of view of said camera and/or if his eyes leave the field of view of said camera.

12. A method of evaluating a level of fatigue of an operator, the method being carried out by a transportable system according to claim 1 and comprising:

acquiring a plurality of images of the operator's face, measuring the operator's heart rate;

processing the acquired images and the heart rate measurement to calculate the level of fatigue of the operator; and if the level of fatigue is above a predefined threshold, transmitting an alert to the operator and/or to an administrator.

* * * * *